Aug. 16, 1938.  A. S. DUNCAN ET AL  2,127,443
COILABLE MEASURING RULE
Filed Dec. 11, 1935
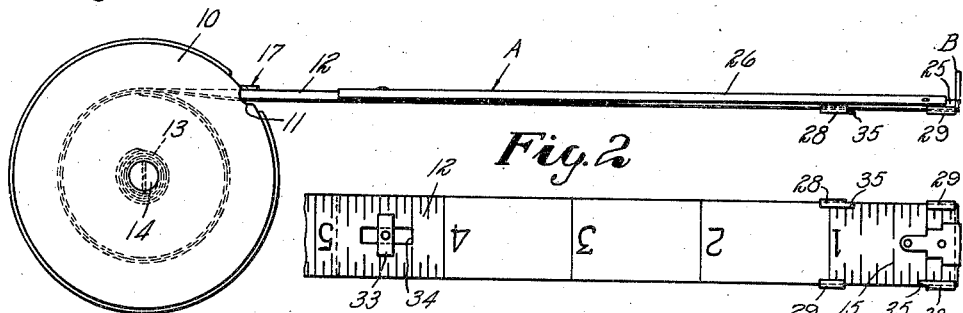
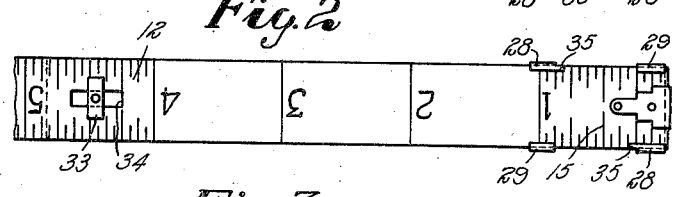
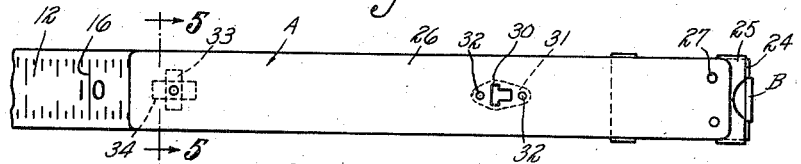
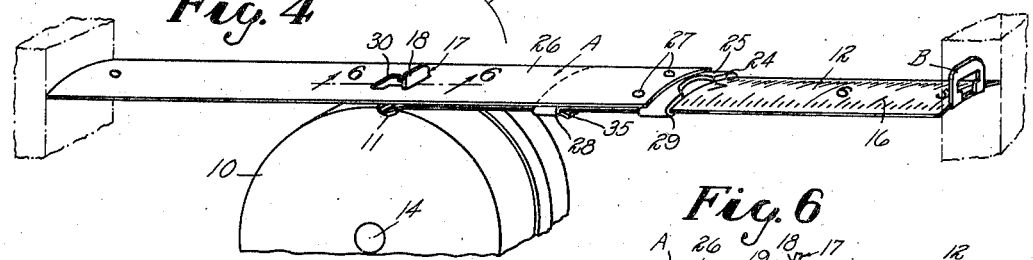
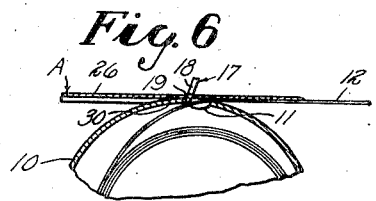
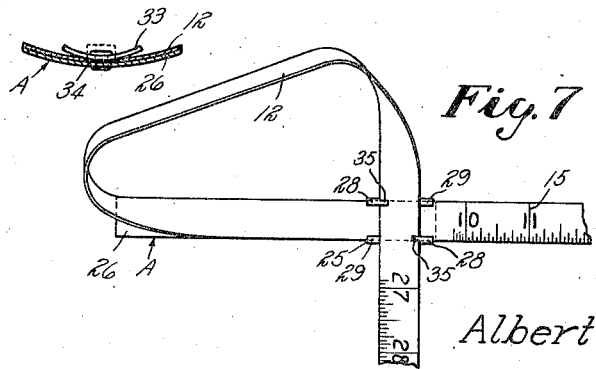
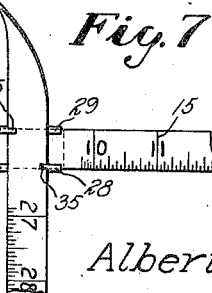
Inventor
Albert Stanley Duncan
Austin L. Stowell
By W. Clay Lindsey
Attorney Patented Aug. 16, 1938

2,127,443

UNITED STATES PATENT OFFICE 2,127,443

COILABLE MEASURING RULE

Albert Stanley Duncan and Austin L. Stowell, New Britain, Conn., assignors to The Stanley Works, New Britain, Conn., a corporation of Connecticut Application December 11, 1935, Serial No. 53,927

12 Claims. (Cl. 33—137)

This invention relates to coilable rules of the type having a casing and a measuring tape adapted to be wound therein into an externally wound coil, the tape being in the form of a thin resilient metal strip having a bent transverse form (for example, a concavo-convex cross section) so that it will resist bending and will, when extended, automatically assume a rectilinear state or rodlike form.

The aim of the invention is to provide, in a measuring device of this type, an improved and simple arrangement whereby inside measurements, as well as outside ones, may be very conveniently taken.

A further aim of the invention is to provide an improved arrangement by means of which a portion of the tape may be secured substantially at right angles to the remaining portion in order that the measurement of objects or distances out of the convenient reach of the user of the device may be taken with facility.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown, for illustrative purposes, one embodiment which the present invention may take:

Figure 1 is a side view of the improved rule with the tape in partially extended position, and the extension member being shown in its inoperative position against the tape;

Fig. 2 is a view looking at the concave face of the extended portion of the tape;

Fig. 3 is a view looking at the reverse side of the tape and extension;

Fig. 4 is a perspective view of the device in use for taking an inside measurement;

Fig. 5 is a sectional view taken substantially on the line 5—5 of Fig. 3 and illustrating the means for locking the inner end of the extension to the tape;

Fig. 6 is a sectional view taken substantially on the line 6—6 of Fig. 4 and showing the manner in which the extension member is secured in operative position to the casing; and Fig. 7 is a view of the tape showing the manner in which a measurement of an object out of convenient reach may be readily taken.

Referring to the drawing in detail, 10 designates a casing or holder of any suitable size or configuration, it being shown as being generally circular and as having an entrance slot 11 in its peripheral wall. The tape, designated generally by the numeral 12, is of the type described in the patents to H. A. Farrand No. 1,402,509, granted February 3, 1922, and No. 1,730,199, granted October 1, 1929. This tape is in the form of a metallic ribbon having a concavo-convex cross section, the ribbon being sufficiently flexible to be rolled or coiled and having sufficient stiffness and resiliency to cause it to assume a rectilinear state when unrestricted. When a rule of this type is freely bent longitudinally, its cross sectional form, at its bent portion, is changed from an arcuate to a flat, and the bent portion assumes a longitudinal curvature the radius of which generally corresponds to the radius of the arc of the cross sectional form of the rule in its extended state. By preference, the improvements of the present invention are incorporated in a rule of the pull-push type and, for illustrative purposes, there is shown, within the casing, a winding strip 13 anchored at its inner end to a stud 14 and secured at its outer end to the inner end of the measuring tape. This winding strip preferably has a tension which only substantially counterbalances the resistance of friction of the parts and the tendency of the measuring tape to resist bending. The rule is provided at its outer end with a hook B. The concave face of the rule has a scale 15 which, as shown in Fig. 2, starts with zero at the free end of the tape. On the convex face of the tape is a scale 16 which starts with a number greater than zero, in the present instance the same starting at the five inch mark. The casing is provided with a lug or tongue 17 which extends outwardly and forwardly from the rear edge of the entrance opening 11. This lug is generally of T form, it having a head 18 and a neck 19 connecting the head to the casing.

The letter A designates generally an extension adapted to be employed when taking inside measurements. The extension, in the present illustrative disclosure, includes a slide or clip 25 slidably mounted on the tape and a flexible strip 26 corresponding generally in character to the measuring tape and secured at its forward end to the clip 25, as by means of rivets 27. More particularly, the clip 25 comprises a more or less rigid sheet metal member transversely curved correspondingly to the transverse curvature of the tape and adapted to overlie the convex surface of the tape. The clip has, at each of its margins, a pair of spaced ears 28 and 29 which are turned in under the tape so as to hold the clip slidably in place on the tape. The strip 26 comprises a thin strip of resilient metal having a concavo-convex cross section corresponding to the tape. It will, therefore, when coiled, change at the point of tangency with the coil from a curved sectional form to a flat transverse shape, the same as said tape. The forward edge 24 of the clip constitutes an index mark. The length of the extension, that is, the distance from the forward edge 24 of the clip to the rear end of the strip 26, is equal to the missing part of the scale 16, that is to say in the present illustrative disclosure the length of the extension is five inches.

In order to secure the extension to the casing when an inside measurement is taken, the strip has, between its ends, a keyhole slot 30 adapted to receive and interlock with the lug 17. This slotted portion of the strip may be reinforced by a small, thin, resilient plate 31 secured in place by rivets 32. The keyhole slot has an enlarged end for receiving the head 18 and a stem portion the margins of which are adapted to engage beneath the arms of the head 18 when the strip is in operative position.

In order to secure the extension adapted sliding movement relative to the tape and close against the tape when the extension is not in use, the extension, adjacent its rear end, is provided with a small metal turn button 33 adapted to operate through a corresponding slot 34 in the measuring tape. When the extension is not in use, it is locked in position on the outer end of the tape, as shown in Figs. 2 and 3, it being observed that the turn button 33, as shown in Fig. 5, has been inserted through the slot 34 and turned at right angles thereto.

While the tape is completely stored within the casing, and during the normal use of the tape, for example when outside measurements are being taken, the extension is locked against the outer portion of the tape by the turn button 33. The operations of pushing the tape completely into the casing and withdrawing the tape from the casing are not interfered with by the extension as this extension, being of the same character as the tape is coiled and uncoiled simultaneously with that portion of the tape which it overlies. When it is desired to take an inside measurement, the rear end of the extension strip is disconnected from the turn button, the head of the lug 17 is inserted through the enlarged end of the key slot, and then the extension is moved rearwardly, that is, to the left referring to Fig. 4, so as to engage the margins of the stem of the slot between the arms of the head 18 and the peripheral wall of the casing. Due to the fact that the tape tends to uncoil, that is the free end of the tape tries to turn in the direction of the arrow C, Fig. 4, such leverage is exerted on the strip as will cause the latter to be anchored in place with respect to the lug 17. The free end of the extension may now be placed against one of the opposed surfaces, the distance between which is to be determined, and the free end of the tape is drawn out until it engages the other opposing surface. The distance between these opposing surfaces may now be determined by merely reading the scale mark on the tape which is in registry with the index edge 24 of the extension.

Further, in accordance with the present invention, the clip is so constructed and arranged that it may be employed to hold the outer end of the tape at substantially right angles to the main length of the tape, as shown most clearly in Fig. 7. To this end, the diagonally disposed ears 28 of the clip are provided at their opposed ends with lugs 35 which overlie, but are slightly spaced from, the concave face of the tape. The distance between these ears lengthwise of the tape is somewhat less than the width of the tape in order that a portion of the tape, when bent at right angles to that portion which carries the clip may have its margins engaged between these lugs and the portion of the tape carrying the clip. With this arrangement, when it is desired to take a measurement out of the convenient reach of the operator, as, for example, when it is desired to take a measurement of an overhead shade, the outer end of the tape may be brought into crossed relation to the main extended portion of the tape and engaged with the lugs, as shown in Fig. 7. When so engaged with the lugs, the portion of the tape between the lugs is flattened somewhat so that it will not become readily disengaged from the lugs. The operator may now draw out the tape to the necessary length and bring the cross portion of the tape into relation with the object to be measured.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. In a rule of the character described, a resilient measuring tape having a transverse curvature and an inherent tendency to assume a rectilinear state, a casing within which said tape is adapted to be wound and having a single entrance slot through which said tape is moved, an extension mounted on said tape and having a resilient member adapted to be coiled with said tape within the casing and adapted to be withdrawn from said casing through said slot, a slidable connection between the forward end of the extension and the tape whereby said extension may be drawn rearwardly of said casing, and cooperative locking means carried by said casing and said extension intermediate of its ends for removably locking said extension when in rearward position.

2. In a rule of the character described, a resilient measuring tape having a transverse curvature and an inherent tendency to assume a rectilinear state, a casing within which said tape is adapted to be wound and having a single entrance slot through which said tape is moved, an extension mounted on said tape and including a resilient strip having a transverse curvature and an inherent tendency to assume a rectilinear state, said strip being coilable with said tape within the casing and being completely removable from said casing through said slot, a slidable connection between the forward end of the extension and the tape whereby said extension may be drawn rearwardly of the casing, and cooperative locking means carried by said casing and extension for detachably and positively connecting said strip between its ends in a predetermined position on said casing adjacent said slot and substantially in alignment with the extended portion of the tape.

3. In a rule of the character described, a resilient measuring tape having a transverse curvature and an inherent tendency to assume a rectilinear state, a casing within which said tape is adapted to be wound and having a peripheral wall with a slot through which said tape is moved, an extension slidably mounted on said tape and having a resilient strip adapted to be coiled with said tape within the casing and adapted to be withdrawn from said casing through said slot, said strip having an opening between its ends, and a member on said casing adjacent the rear edge of said slot and having a shoulder opposed to the peripheral wall of the casing, said opening being arranged to receive said member with the edge of the opening between said shoulder and peripheral wall.

4. In a rule of the character described, a casing having an entrance slot and a T-shaped lug adjacent the rear edge of said slot and having a neck portion and abutments opposed to the peripheral wall of the casing, a resilient measuring tape having a transverse curvature and an inherent tendency to assume a rectilinear state and adapted to be moved through said slot and to be externally wound within said casing, and an extension slidably mounted on said tape and having a resilient strip with a transverse curvature and an inherent tendency to assume a rectilinear state, said extension being adapted to be wound within said casing with said tape and to be withdrawn from the casing through said slot, said strip having between its ends a slot adapted to receive the neck of said lug with its marginal edges between said abutments and the peripheral wall of said casing.

5. In a rule of the character described, a casing provided with a peripheral wall having a slot and a T-shaped lug extending from the rear edge of said slot, a measuring tape having a transverse curvature and an inherent tendency to assume a rectilinear state and adapted to be moved through said slot and to be wound within said casing, and an extension comprising a clip slidably mounted on said tape and a resilient transversely curved strip connected at its forward end to said clip and adapted to be wound in said casing with said tape, said strip having between its ends a key-hole slot adapted to detachably receive said lug.

6. In a rule of the character described, a resilient measuring tape having a transverse curvature and an inherent tendency to assume a rectilinear state, a casing within which said tape is adapted to be wound and having a single entrance slot through which said tape is moved, an extension having its forward end slidably mounted on said tape and having a resilient member adapted to be coiled with said tape within the casing and adapted to be completely withdrawn from said casing through said slot, and cooperative locking means carried by said casing and extension for connecting said extension between its ends to said casing adjacent said slot in a predetermined position on the casing.

7. In a rule of the character described, a resilient measuring tape having a transverse curvature and an inherent tendency to assume a rectilinear state, a casing within which said tape is adapted to be wound and having an entrance slot through which said tape is moved, an extension slidably mounted on said tape and including a resilient strip having a transverse curvature and an inherent tendency to assume a rectilinear state, said strip being coilable with said tape within said casing and being removable from said casing through said slot, means for detachably connecting said strip between its ends to said casing adjacent said slot and substantially in parallelism to the extended portion of the tape when withdrawn from the casing whereby inside measurements may be taken, and means for connecting said extension to the forward end of said tape and against movement relative thereto when said extension is not in position for taking inside measurements.

8. In a rule of the character described, a casing provided with a peripheral wall having a slot and a T-shaped lug extending from the rear edge of said slot, a measuring tape having a transverse curvature and an inherent tendency to assume a rectilinear state and adapted to be moved through said slot and to be wound within said casing; an extension comprising a clip slidably mounted on said tape and a resilient transversely-curved strip connected at its forward end to said clip and adapted to be wound in said casing with said tape, said strip having between its ends a key-hole adapted to detachably receive said lug; and means for securing said extension upon, and against longitudinal movement relative to, the forward end of said tape and including a turn button carried by said strip and an elongated slot in the measuring tape adapted to accommodate said turn button.

9. In a rule of the character described, a casing having a peripheral wall provided with a single slot, a resilient measuring tape having a transverse curvature and an inherent tendency to assume a rectilinear state and adapted to be moved through said slot and to be wound within said casing, said tape having on one face a scale starting with zero at the outer end of the tape, said tape having on its opposite face a scale starting with a numeral greater than zero at the outer end of the tape, an extension including a clip slidably mounted on said tape and a resilient strip secured to said clip and positioned on the last mentioned face of said tape, said extension being adapted to be withdrawn from said casing through said slot and to be wound within the casing with said tape, the forward edge of said clip constituting an index mark and said extension corresponding in length to the amount lacking from the said second mentioned scale, and cooperative locking means carried by said casing and extension for positively but removably securing said extension to said casing in a predetermined position on the casing and adjacent said slot and in alignment with the extended portion of said tape.

10. In a rule of the character described, a measuring tape having a transverse curvature and an inherent tendency to assume a rectilinear state, and a clip slidably mounted on said tape and having spaced ears bent about the longitudinal edges of the tape, two of said ears being spaced on opposite sides of said tape and having opposed lugs spaced slightly from the tape and spaced apart lengthwise of the tape a distance somewhat less than the width of the tape whereby a portion of the tape, when bent at right angles to that portion which carries the clip, may have its margins engaged between the lugs and the latter portion of the tape.

11. In a rule of the character described, a casing provided with a peripheral wall having a slot, a measuring tape having a transverse curvature and an inherent tendency to assume a rectilinear state and adapted to be moved through said slot and to be wound within said casing, and an extension comprising a clip slidably mounted on said tape and a resilient transversely-curved strip connected at its forward end to said clip and adapted to be wound in said casing, said clip having ears bent about the longitudinal edges of the tape and provided with lugs arranged to hold a length of the tape at right angles to the length of the tape carrying the clip.

12. In a rule of the character described, a measuring tape having a transverse curvature and an inherent tendency to assume a rectilinear state, a clip slidably mounted on the tape, and spaced ears on said clip respectively overlying opposite edges of the tape and disposed longitudinally of the tape, said ears being adapted to removably secure another portion of the tape angularly to and in slidable transverse frictional contact with the transversely curved tape portion initially mounted with said clip.

ALBERT STANLEY DUNCAN.
AUSTIN L. STOWELL.